United States Patent Office 3,659,011
Patented Apr. 25, 1972

3,659,011
PROMOTION OF ANALGESIC AND SEDATIVE ACTION WITH 5-BROMOISATIN
Jacques Debat, Paris, France, assignor to Institut de Recherches Chimiques et Biologiques Appliquees, I.R.C.E.B.A., Paris, France
No Drawing. Filed July 22, 1969, Ser. No. 843,740
Claims priority, application Great Britain, July 26, 1968, 35,815/68
Int. Cl. A61u 27/00
U.S. Cl. 424—274
2 Claims

ABSTRACT OF THE DISCLOSURE

Pharmaceutical compositions containing, as active ingredient, 5-bromoisatin have valuable analgesic and sedative properties. The 5-bromoisatin can be prepared by forming an aqueous suspension of isatin and brominating the isatin in the suspension.

---

This invention is concerned with pharmaceutical compositions and is based on the discovery that 5-bromoisatin has valuable analgesic and sedative properties.

5-bromoisatin has been known for several decades as a chemical compound in certain fields of the industry, but its pharmacological activity has not hitherto been appreciated or described. In addition to its analgesic and sedative activity, we have found that this compound, unlike acetylsalicylic acid, has no unfavourable side effects and, in particular, it does not increase the bleeding time, which is a known disadvantage of acetylsalicylic acid and contra-indicates the use of the latter in some patients.

According to the present invention, therefore, we provide a pharmaceutical composition which comprises, as active ingredient, 5-bromoisatin together with an inert, physiologically acceptable substance.

The invention also includes a process for the preparation of 5-bromoisatin which comprises forming an aqueous solution of isatin at a pH of 9 or more, acidifying the solution to a pH of approximately 2 and brominating the suspension of isatin so formed to produce 5-bromoisatin.

The composition of the invention may contain any suitable inert physiologically acceptable solid or liquid carrier or diluent. When a liquid diluent or carrier is used, it is preferably sterile. The compositions are particularly suited for oral administration, for example in the form of capsules, tablets, dragees, gelatine-coated pills, solutions and suspensions, and for rectal administration in the form of suppositories. The compositions may also be in a sterile injectable form.

In the process of the invention, the solution of isatin is preferably formed in aqueous sodium hydroxide and the solution acidified with hydrochloric acid. The bromination of the suspension of isatin can be carried out by any of the known methods.

The following example describing the preparation of 5-bromoisatin by the process of the invention is given by way of illustration only:

EXAMPLE 40 g. of isatin were dissolved in three litres of water containing 13.5 g. of NaOH. The resulting mixture was acidified to pH 2 with HCl, with vigorous stirring, so as to form a fine suspension of isatin in water. 17 cc. of bromine were added and the whole was left to stand for 20 hours with continuous stirring. The precipitate was filtered off, washed until neutral, dried and recrystallised in ethanol. This gave 5-bromoisatin, M.P. 255° C., in a yield of about 70%.

Bromoisatin has been subjected to the following pharmacological trials. The effects of the compound on behaviour, its toxicity and its analgesic and sedative activities were determined for this purpose.

(I) GENERAL CONDITIONS OF TESTS

Male and female adult mice, all weighing between 18 and 22 g., were used. The products, in suspension in a 10% aqueous solution of gum, were given orally by means of a probang in a uniform volume of 0.4 ml. per 20 g. of body weight, controls receiving the same gum solution in every case. The average fast was about 3 hours before the tests.

(II) PRELIMINARY TESTS

The tests were carried out on 50 mice divided into 5 batches of 5 males and 5 females each, which received oral doses of 0.2, 0.6, 1, 1.4 and 1.8 g. of bromoisatin/kg. of body weight. The following observations were made.

(1) Mortality

The number of dead after 24, 48 and 72 hours was recorded among the 5 male animals of each batch. The results are shown in Table I.

TABLE I

| Batches | Doses of bromoisatin, g./kg. | Mortality 24 hrs. | 48 hrs. | 72 hrs. | Total mortality, 8 days |
|---|---|---|---|---|---|
| No. 1 | 0.200 | | | | 0/10 |
| No. 2 | 0.600 | | | | 0/10 |
| No. 3 | 1.000 | | | 1 | 1/10 |
| No. 4 | 1.400 | 1 | | | 1/10 |
| No. 5 | 1.800 | | 4 | 1 | 5/1 |

(2) Rectal temperature

The temperatures were recorded before and one hour, three hours, four hours, seven hours and twenty-four hours after ingestion. The averages of these temperatures were found for the animals of each group. A considerable and rapid drop in the temperature of approximately 6 to 8° C. for all the doses ingested was noted. The temperatures rose again after the fourth hour in the case of the batches which had received 0.200, 0.600 and 1 g./kg. The animals that had received 1.8 g./kg. still had a very low temperature 24 hours after ingestion; 48 hours after administration, the temperature of the animals became normal again.

(3) Haffner, Régnier and traction tests

Reflexes were tested before administration and one hour, three hours and twenty-four hours after administration: firstly, by the Haffner test which consists of placing a haemostatic clip at the base of the tail, causing a normal mouse to turn round immediately, and secondly, by the Régnier test which consists of touching the eyeball with a hair mounted on a glass rod, in order to stimulate the oculopalpebral reflex.

In addition, sedative action was investigated by means of the traction test which consists of attaching the mouse to a wire by the forepaws, when a normal mouse will grip with a rear paw within 5 seconds.

Table II shows the results obtained; the number of mice out of 5 that reacted negatively is shown.

TABLE II

| Doses of bromoisatin, g./kg. | Traction | | | Haffner | | | Régnier | | |
|---|---|---|---|---|---|---|---|---|---|
| | 1 h. | 3 h. | 24 h. | 1 h. | 3 h. | 24 h. | 1 h. | 3 h. | 24 h. |
| 0.200 | 4 | 1 | 0 | 0 | 0 | 0 | 0 | 0 | 0 |
| 0.600 | 5 | 5 | 0 | 2 | 4 | 0 | 0 | 0 | 0 |
| 1.000 | 5 | | 2 | 5 | | 0 | 0 | | 0 |
| 1.400 | 5 | | 1 | 5 | | 1 | 0 | | 0 |
| 1.800 | 5 | | 5 | 5 | | 5 | 1 | | 0 |

The above-described preliminary tests showed a sedative action from 0.200 g./kg. and an analgesic action from 0.600 g./kg. On the other hand, no local anaesthetic action was noted.

(4) Crossing of ipsilateral paws

The time when catalepsy appeared was investigated by the crossing of the ipsolateral paws; cataleptic animals will remain in that position.

Catalepsy began after 1 to 1½ hours with a dose of 0.600 g./kg. and after 30 minutes with a dose of 1.800 g./kg. With all the doses, except 1.800 g./kg., it disappeared on the following day.

(III) ACUTE TOXICITY

Precise determination of $LD_{50}$ with oral administration in mice 50 mice divided into 5 batches of 5 males and 5 females each were used, and the following increasing doses were given: 1.4, 1.8, 2.2, 2.6 and 3.0 g. of bromoisatin/kg. of body weight respectively to each of the batches.

Table III shows the results obtained.

TABLE III

| Doses of bromoisa-tin, g./kg. | Number of mice | Mortality | | | | | Total mortality |
|---|---|---|---|---|---|---|---|
| | | 24 hrs. | 48 hrs. | 72 hrs. | 4 days | 7 days | |
| 1.4 | 5 males plus 5 females. | | 2 | | 1 | | 3/10 |
| 1.8 | do | 1 | 2 | 1 | 1 | | 5/10 |
| 2.2 | do | 1 | 4 | 2 | | 1 | 8/10 |
| 2.6 | do | 7 | | | 1 | 1 | 9/10 |
| 3.0 | do | 1 | 7 | 1 | | | 9/10 |

From the results of all the toxicity tests (Tables I and III), the following may be determined:

Maximum tolerated dose M.T.D.=0.910 g./kg.;
Minimum lethal dose M.L.D.=3 g./kg.

The median lethal dose was also determined; $LD_{50}=1.75$ g./kg. according to curve plotted on log-probability paper for the percentage of mortality as a function of the dose given.

(IV) ACTION ON CENTRAL NERVOUS SYSTEM

(A) ANALGESIC ACTION

(1) Phenylquinone test

This test may be carried out by one of two methods.

Siegmund method: An 0.020% solution of phenylquinone (phenylbenzoquinone) in 5% aqueous alcohol is injected intraperitoneally into mice weighing 20 g. (uniform dose of 0.25 ml.).

All the animals show contraction of the sides and belly and stretching of the rear paws after the first 10 minutes. This lasts for about 60 minutes in most cases; nevertheless, the action is always compared with that of controls.

The observations are made for 5 minutes at 15, 30 and 45 minutes after the administration of the compound to be tested, following the 10 minutes of preliminary observation. Analgesia is assumed in any animal that no longer shows these symptoms during the 5 minutes of observation.

In this test, 36 male and female mice weighing between 18 and 22 g. (having fasted for 3 hours) are used. The mice are divided into 3 uniform batches of 12 mice each. The treated mice receive bromoisatin in doses of 0.100 and 0.200 g./kg., and the control mice receive a 10% gum solution.

Table IV shows the results obtained.

TABLE IV

| Doses of bromoisatin, g./kg. | Batch No. | Percentage of animals with analgesia after— | | |
|---|---|---|---|---|
| | | 15 min. | 30 min. | 45 min. |
| 0 (controls) | 1 | 12 | 23 | 12 |
| 0.100 | 2 | 38 | 63 | 75 |
| 0.200 | 3 | 70 | 90 | 90 |

Boissier method: The general conditions of the trial are similar to those of the Siegmund method, phenylquinone being used in the same dose. The compounds to be tested are given in a uniform volume of 0.4 ml. for 20 g. of body weight orally 30 minutes before the injection with phenylquinone.

The observation consists in counting the number of torsions for each animal from the fifth to the tenth minute after the injection of phenylquinone. In every case a comparison is made with controls and the inhibition percentage in relation to these controls is calculated. If $N$ is the number of torsions of the controls and $N'$ that of the animals treated, the relation $$\frac{N-N'}{N} \times 100$$

gives this percentage.

Table V shows results of the various tests. All these experiments were carried out blind under the same conditions.

TABLE V

| Doses of bromoisatin, g./kg. | Number of mice used | Total number of torsions | Average number of torsions | Percentage of inhibition |
|---|---|---|---|---|
| 0 (controls) | 93 | 1,496 | 16.2±2.28 | |
| 0.0125 | 6 | 80 | 13.3±11.25 | 18 |
| 0.025 | 20 | 185 | 9.25±3.70 | 43 |
| 0.050 | 52 | 259 | 5.0±2.16 | 69 |
| 0.075 | 19 | 46 | 2.4±1.7 | 85 |
| 0.100 | 59 | 82 | 1.4±0.8 | 91 |

By plotting the percentage of inhibition against the dose on log-probability paper, a curve is obtained whereby the median effective dose can be estimated; this is about 0.30 g./kg. Under the same conditions, the median effective dose ($ED_{50}$) of aspirin is 0.080 g./kg.

The phenylquinone tests show that bromoisatin has an analgesic action; the $ED_{50}$ is less than 0.100 g./kg. according to the Siegmund method and it is 0.030 g./kg. according to the Boissier method.

(2) Hot-plate test

A mouse placed on a plate heated to 56.5° C. reacts by licking its forepaws. The time necessary for this reaction is measured with a chronometer. A preliminary selection retains only the animals that react between 4 and 10 seconds. Observation is repeated 30 minutes, 1½ hours, 2 hours and 3 hours after the oral administration of the compound to be tested.

Any animal that has not reacted in 30 seconds (maximum exposure time) is regarded as having been given complete analgesia. The average reaction times are calculated for each batch of 12 mice and they are shown in the table with the limits of variation.

Table VI shows the results of three tests, two covering 4 batches of animals and one covering 3, one batch in each test acting as controls and the others receiving 0.025, 0.050, 0.075, 0.100, 0.150 and 0.270 g. of bromoisatin/kg. of body weight.

TABLE VI

| Doses of bromoisatin, g./kg. | Average reaction time in seconds | | | |
|---|---|---|---|---|
| | 1 hour before treatment | 30 minutes after treatment | 1½ hours after treatment | 3 hours after treatment |
| First test: | | | | |
| 0 (controls) | 6.8 | 9 | 6.5 | 7 |
| 0.100 | 7 | 17.8 | | |
| 0.270 | 5.5 | | 30 | |
| Second test: | | | | |
| 0 (controls) | 7±1.1 | 7.5±1.3 | 7±1.4 | 9.7±1.5 |
| 0.050 | 6.8±1.1 | 16.2±4 | 10.6±4 | 9±5.3 |
| 0.100 | 7.1 | 25.4 | 22.2 | 11.1 |
| 0.150 | 6.6 | 29.6 | 21.9 | 15.0 |
| Third test: | | | | |
| 0 (controls) | 6±0.6 | 7.4±1 | 8±1 | 10±1.7 |
| 0.025 | 6.3±0.9 | 10.8±2.3 | 9.5±1.3 | 11.4±2.0 |
| 0.050 | 6.7±1.1 | 16.9±2.8 | 14.3±1.95 | 10.2±1.6 |
| 0.075 | 6.7±0.9 | 22.1±3.7 | 11.5±4.5 | 11.6±3.0 |

These tests were repeated on several batches of animals which were given varied doses of the compound. A statistical evaluation of the results indicates that the delay of the reaction time, i.e. the analgesic action of bromoisatin, is 30 minutes after ingestion which is highly significant with a dose of 0.025 g./kg.

The percentage of animals with total analgesia, i.e. the animals whose reaction times were longer than 30 seconds, was also calculated (by the method of Bonet-Maury) for each dose. From the curve showing this percentage as a function of the dose on log-probability paper, the median effective dose after 30 minutes can be estimated; $ED_{50}$ (30 minutes) = 0.090 g./kg.

(3) Randall and Selitto method

The analgesic action of the compound is compared with that of acetylsalicylic acid. The apparatus of Randall and Selitto exerts on the paw of a rat a force that increases according to the time, or a regular increase of a certain number of grams a second. The pressure exerted is released when the animal cries out.

30 female rats weighing from 90 to 120 g. were divided into three batches of 10 animals each. A 20% suspension of beer yeast (0.10 ml.) was injected under the superficial plantar aponeurosis of the right paw. Two hours after the yeast, the compound to be tested was given orally in a uniform volume of 0.5 ml. per 100 g. body weight.

The first batch received a 10% gum solution.

The second batch received acetylsalicylic acid in suspension in a dose of 0.400 g./kg.

The third batch received bromoisatin in suspension in a dose of 0.400 g./kg.

The measurements were taken 1 hour after the compounds had been given.

The average results expressed in grams with the limits of variation are shown in the following table.

TABLE VII

| Doses of compound, g./kg. | Pressure, grams | Percentage increase | Significance threshold |
|---|---|---|---|
| 0 (controls) | 133.5±30.1 | | |
| Acetylsalicylic acid, 0.400 | 279.6±93 | 109 | 0.01>p>0.001 |
| Bromoisatin, 0.400 | 352.5±116 | 163 | p>0.001 |

According to the Randall and Selitto test, therefore, bromoisatin has analgesic properties that are superior to those of acetylsalicylic acid in a dose of 0.400 g./kg.

(B) SEDATIVE ACTION (1) Traction test according to Courvoisier

In this test, a mouse which has been dosed with bromoisatin is suspended by its front paws from a thread. A normal (undosed) mouse will clench its rear paw(s) within 5 seconds. Five batches each containing five mice were tested, each batch being dosed with a different amount of bromoisatin. The numbers of mice in each batch showing a negative reaction (no clenching) are shown in Table VIII. These mice are sedated and it can be seen that sedation occurs even with the smallest dose (0.200 g./kg.) of bromoisatin.

TABLE VIII

| Doses of bromoisatin, g./kg. | Number of mice sedated after— | | |
|---|---|---|---|
|  | 1 hour | 3 hours | 24 hours |
| 0.200 | 4 | 1 | 0 |
| 0.600 | 5 | 5 | 0 |
| 1.000 | 5 |  | 2 |
| 1.400 | 5 |  | 1 |
| 1.800 | 5 |  | 5 |

(2) Funnel test according to Boissier (1960)

In this test the mice are introduced into a vertical glass cylinder from which they can only escape backwards. The time taken by each mouse to pass a fixed mark is recorded. A number of tests were carried out and the conditions and results are set out in Table IX.

The number of mice which took more than 30 seconds were counted and classed as sedated. In the table the numbers of these mice are expressed as percentages of the total number of mice in the batch.

TABLE IX

| Doses of bromoisatin, g./kg. | Number of mice in batch | Number of mice "sedated" (percent) | | | |
|---|---|---|---|---|---|
|  |  | Before treatment | After ½ hr. | After 1½ hrs. | After 2½ hrs. |
| 0 (controls) | 8 | 0 | 0 | 25 | 0 |
| A.130 0.050 | 10 | 0 | 20 | 0 | 10 |
| A.130 0.100 | 8 | 0 | 75 | 75 | 25 |
| A.130 0.150 | 11 | 0 | 90 | 45 | 25 |

It can be seen that at doses of 0.100 g./kg. and above, significant "sedation" occurs.

(3) Turning rod

A normal (control) mouse is capable of remaining almost indefinitely on a slowly (10 r.p.m.) turning rod. In this test, 4 batches of mice were tested, one as control, and the number of mice failing to remain for 3 minutes on the rod was counted and is expressed in Table X as a percentage of the number of mice in the batch. The mice failing to remain on the rod are referred to as "sedated."

TABLE X

| Doses of bromoisatin, g./kg. | Number of mice in batch | Number "sedated" (percent) | | |
|---|---|---|---|---|
|  |  | Before treatment | After 1 hr. | After 3 hrs. |
| 0 (controls) | 12 | 0 | 16.6 | 8.3 |
| A.130 0.050 | 12 | 0 | 33.3 | 0 |
| A.130 0.100 | 12 | 0 | 83.3 | 33.3 |
| A.130 0.150 | 13 | 0 | 100 | 53.8 |

It can be seen that at doses of 0.100 g./kg. and above, significant "sedation" occurs.

(4) Potentiation of barbituric narcosis

The barbiturate chosen is sodium pentobarbital (Nembutal) injected intraperitoneally in a dose of 30 mg. per kg. of body weight in a uniform volume of 0.4 ml. per 20 g. body weight of a solution of 150 mg. percent prepared extemporaneously.

Immediately after the injection of the barbiturate, the mice are placed in an observation enclosure. The following are noted for each of them:

Sending-to-sleep time S.S.T., the time between the injection of the barbiturate and the disappearance of the turning-round reflex.

Sleep time S.T., the time between the disappearance and reappearance of the turning-round reflex.

For each batch, the following are therefore determined:

The number of animals that have slept in relation to the number of animals in the experiment (together with the percentage of sleep per batch);

The average of the sending-to-sleep and sleep times in relation to the number of animals that have actually slept, together with the units of variation from this average.

The experiments were carried out on 80 mice (40 males and 40 females). The animals treated received bromoisatin in doses of 0.050, 0.100 and 0.150 g./kg. of body weight.

According to statistical analysis of the results, the sending-to-sleep time is significantly shortened ($p > 0.01$) at doses of 0.100 and 0.150 g./kg. On the other hand, no difference between the treated animals and the controls were found as regards the sleep time.

In conclusion, from a dose of 0.100 g./kg. bromoisatin exerts a slightly sedative action as shown by the shortening of the sending-to-sleep time caused by sodium pentobarbital and the increase in the percentage of mice sent to sleep.

(V) ACTION ON BLEEDING TIME

This action was studied in guinea pigs weighing about 450 g. each according to the Duke method. The test was carried out on 30 guinea pigs divided into three batches, the product being given in every case in a volume of 1 ml.

(a) 10 controls receiving only the excipient (10% gum solution);
(b) 10 receiving acetylsalicyclic acid in a dose of 200 mg/kg.;
(c) 10 receiving bromoisatin in a dose of 200 mg./kg.

The bleeding time of the animals was measured before the drug was given and 1 hour afterwards.

The average of the bleeding times for the 10 animals of each batch was then measured. Table XI shows the results obtained.

TABLE XI

| Batch | Average bleeding times | |
|---|---|---|
| | Before treatment | After treatment |
| (a) Controls | 1 min. 57±28.5 sec | 1 min. 51±25.9 sec. |
| (b) Acetylsalicylic acid | 1 min. 42±18.9 sec | 2 min. 26±44.6 sec. |
| (c) Bromoisatin | 1 min. 24±29.6 sec | 1 min. 39±25.4 sec. |

This shows that, unlike acetylsalicylic acid, which distinctly increases the bleeding time, bromoisatin has no appreciable effect on the bleeding time.

Conclusions from pharmacological trials of bromoisatin

Bromoisatin, whose acute toxicity when given orally to mice is low ($LD_{50}$=1.75 g./kg.), has an important analgesic action, which the Randall and Selitto test has shown to be superior to that of acetylsalicylic acid in a dose of 0.400 g./kg., and also a sedative action which begins to appear in mice with a dose of 0.200 g./kg. according to the traction test and with a dose of 0.100 g./kg. according to the funnel, turning-rod and barbituric-narcosis-potentiation tests.

Furthermore, in contrast to acetylsalicylic acid, bromoisatin has the advantage that it has no side effects; in particular it does not cause any increase in the bleeding time.

Clinical tests have been carried out on 20 patients who have been treated for various complaints with the compositions of the invention. The tolerance was found to be excellent and the results were very good in six cases and very satisfactory in seven other cases.

I claim:

1. A method to promote analgesic and sedative action, which comprises administering to a mammal requiring such action a therapeutically effective dose of 5 bromoisatin.

2. A method to promote analgesic and sedative action, which comprises administering by injection to a mammal requiring such action a therapeutically effective dose of 5 bromoisatin.

References Cited

UNITED STATES PATENTS 3,091,574   5/1963   Colletta et al.

OTHER REFERENCES

Chem. Abst., vol. 54, 16733d (1960).

STANLEY J. FRIEDMAN, Primary Examiner

U.S. Cl. X.R.

260—319.1